(12) United States Patent
Gawande et al.

(10) Patent No.: US 8,751,184 B2
(45) Date of Patent: Jun. 10, 2014

(54) TRANSACTION BASED WORKLOAD MODELING FOR EFFECTIVE PERFORMANCE TEST STRATEGIES

(75) Inventors: Amit Gawande, Maharashtra (IN); Vikas Gupta, Uttar Pradesh (IN)

(73) Assignee: Infosys Limited (IN)

( * ) Notice: Subject to any disclaimer, the term of this patent is extended or adjusted under 35 U.S.C. 154(b) by 414 days.

(21) Appl. No.: 13/179,647

(22) Filed: Jul. 11, 2011

(65) Prior Publication Data

US 2012/0253733 A1    Oct. 4, 2012

(30) Foreign Application Priority Data

Mar. 31, 2011   (IN) .......................... 1068/CHE/2011

(51) Int. Cl.
    *G06F 19/00*     (2011.01)
(52) U.S. Cl.
    USPC ......................................................... 702/120
(58) Field of Classification Search
    USPC .......................................................... 702/120
    See application file for complete search history.

(56) References Cited

U.S. PATENT DOCUMENTS 6,502,131 B1 * 12/2002 Vaid et al. ...................... 709/224

OTHER PUBLICATIONS

Nicholas Pappas, Network IDS & IPS Deployment Strategies, © SANS Institute 2008, 64 pages.*
Business Activity Monitoring (BAM) The New Face of BPM, Jun. 2006, © 2006 webMethods, Inc. All rights reserved, 35 pages.*

* cited by examiner

*Primary Examiner* — Tung S Lau
(74) *Attorney, Agent, or Firm* — Cantor Colburn LLP

(57) ABSTRACT

A method for creating workload model to test performance of a critical application in a data processing network (112) is disclosed. The method includes receiving (202), at one of the plurality of data processing units (114a), an activity log with a plurality of entities from the data processing network (112). The method further includes creating (204) a transaction log of all transactions conducted using the activity log. Further the method determines (206) a plurality of transaction metrics using the transaction log, wherein the plurality of transaction metrics comprises an average transaction response time, a transaction throughput etc. The method further creates a workload model to test the critical performance of an application in the data processing network (112) based on the plurality of transaction metrics and provide effective performance test strategies.

17 Claims, 7 Drawing Sheets

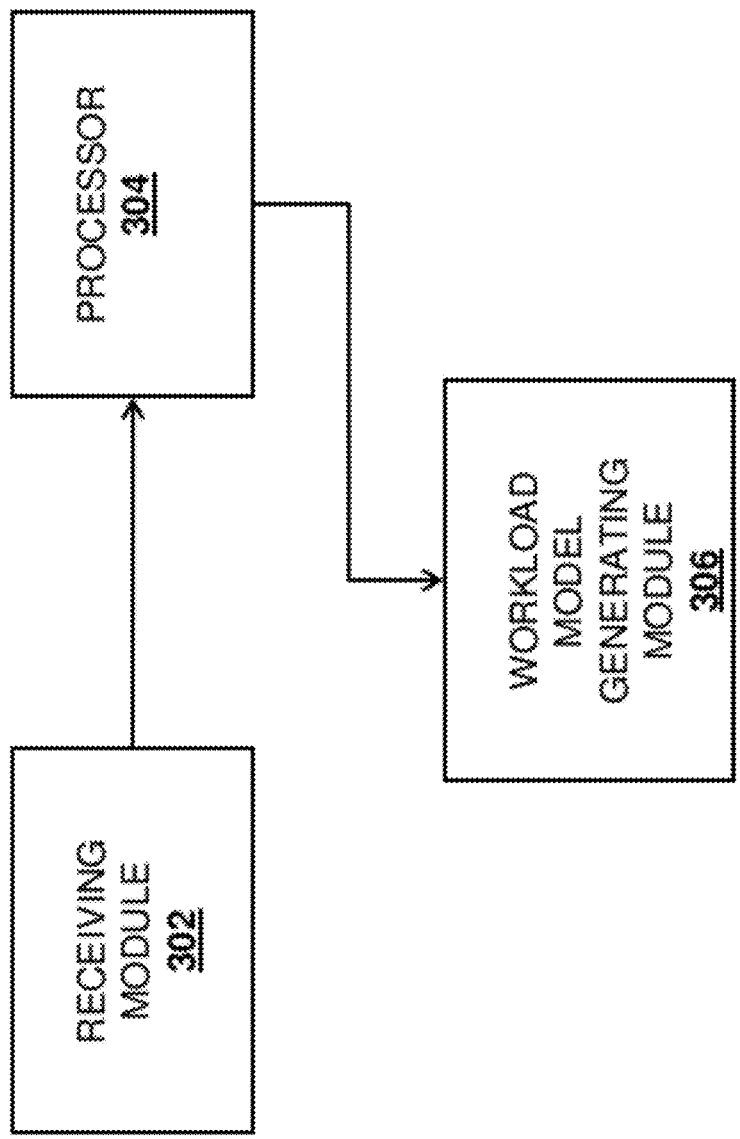

| Date | Time | Request | Cookie | Time Taken |
|---|---|---|---|---|
| 2010/11/09 | 10:00:00 | /bookstore7/home.aspx | 3exbeizjn05uac45bdydoo45 | 2434 |
| 2010/11/09 | 10:00:01 | /bookstore7/book.aspx?id=123 | mcfzcn45Oucdto55bjnp245 | 3876 |
| 2010/11/09 | 10:00:04 | /bookstore7/search.aspx | 3exbeizjn05uac45bdydoo45 | 4432 |
| 2010/11/09 | 10:00:05 | /bookstore7/book.aspx?id=132 | mcfzcn45Oucdto55bjnp245 | 3878 |
| 2010/11/09 | 10:00:10 | /bookstore7/shoppingcart.aspx | mcfzcn45Oucdto55bjnp245 | 3323 |
| 2010/11/09 | 10:00:10 | /bookstore7/searchresult.aspx?q=ds | 3exbeizjn05uac45bdydoo45 | 3454 |
| 2010/11/09 | 10:00:11 | /bookstore7/home.aspx | 25t04355y5rsqm3hsjlve55 | 2434 |
| 2010/11/09 | 10:00:15 | /bookstore7/search.aspx | 25t04355y5rsqm3hsjlve55 | 4432 |
| 2010/11/09 | 10:00:15 | /bookstore7/book.aspx?id=232 | 3exbeizjn05uac45bdydoo45 | 1423 |
| 2010/11/09 | 10:00:18 | /bookstore7/home.aspx | 3exbeizjn05uac45bdydoo45 | 2187 |
| 2010/11/09 | 10:00:21 | /bookstore7/searchresult.aspx?q=ds | 25t04355y5rsqm3hsjlve55 | 3454 |
| 2010/11/09 | 10:00:22 | /bookstore7/book.aspx?id=232 | 3exbeizjn05uac45bdydoo45 | 3878 |
| 2010/11/09 | 10:00:27 | /bookstore7/book.aspx?id=234 | 3exbeizjn05uac45bdydoo45 | 3878 |
| 2010/11/09 | 10:00:28 | /bookstore7/home.aspx | yrjqprepiisyfm55snaeqt55 | 2434 |
| 2010/11/09 | 10:00:32 | /bookstore7/search.aspx | yrjqprepiisyfm55snaeqt55 | 4432 |

FIG. 4

TRANSACTION BASED WORKLOAD MODELING FOR EFFECTIVE PERFORMANCE TEST STRATEGIES

FIELD OF THE INVENTION

The present invention relates to the field of workload modeling concerned with applications running on a data processing network. In particular the invention relates to a system and method for creating a transaction based workload model to test performance of a critical application in a data processing network by analyzing various transaction based metrics and providing effective performance test strategies.

BACKGROUND OF THE INVENTION

It is always desired to know the performance of an application running in a networked environment. The application can be a sequence of web pages, each of which needs to be traversed to complete a particular transaction. A typical example of such an application is online shopping cart. It is important to know the critical performance of such an application because it directly impacts the world of customers and consequently, the market. The performance of an application can be gauged in terms of various metrics like response time of the server, transaction throughput and so on and so forth. A log is maintained at the server end to keep a track of a few elements such as time of request, time of response etc. The numerous performance metrics are calculated on the basis of the aforementioned elements.

The web-server log analysis, that exists now, focuses on fetching the raw data from the logs and on analyzing the web logs at a page level, request level or the entire application level. The current technology refers throughput in terms of bytes per second. The responsiveness of the application is viewed at a page level that represents the server processing time for the requests. This raw data is further used as-is to estimate the basic transaction level performance test strategy metrics, more a guesstimate than an accurate figure.

As existing log analysis focuses on extracting the raw data as-is from the production logs and use it to base performance test strategies. This requires lot of manual interpretation and effort in calculating the critical performance metrics. Each entry is seen as isolated and the techniques do not have intelligence built in to view the bunch of entries termed as business transactions together for a particular user. The analysis hence cannot refer throughput in terms of transactions per second and the responsiveness at the transactions level is difficult to compute. This ends up in a few critical bits of information being lost during such raw data interpretation, adding inaccuracies in the performance test strategies and thus, in performance test results.

SUMMARY OF THE INVENTION

The objective of the present invention focuses on bringing out the performance metrics from the production web server logs at the transaction level than URL (Uniform Resource Locator) level, URL further defined as a destination address.

The present invention employs a method to capture these performance metrics, the method comprises receiving an activity log with a plurality of entities from the data processing network, wherein each entity of the activity log comprises a date, a logged time, a time taken, a session identification number, and a destination address. The activity log is maintained at a plurality of data processing units in the data processing network.

The method then creates a transaction log of all transactions conducted using the activity log, wherein a user relates a transaction, also termed as the business transaction flow and is defined by a user defined logical sequence of destination addresses, to a particular session identification number.

The method further determines a plurality of transaction metrics using the transaction log, wherein the plurality of transaction metrics comprises an average transaction response time, a transaction throughput and it is on the basis of these transaction metrics that the workload model is created. This workload model is used to test the critical performance of an application in the data processing network.

The present invention also employs a system to capture the aforementioned performance metrics, the system comprising of a receiving module to receive an activity log with a plurality of entities from the data processing network, wherein each entity of the activity log comprises a date, a logged time, a time taken, a session identification number, and a destination address;

The system also comprises a processor that is configured to first create a transaction log of all transactions conducted using the activity log, wherein a user relates a transaction, also termed as the business transaction flow and is defined by a user defined logical sequence of destination addresses, to a particular session identification number. The same processor is further configured to determine a plurality of transaction metrics using the transaction log, wherein the plurality of transaction metrics comprises an average transaction response time, a transaction throughput.

Finally, on the basis of these metrics, the system with the aid of workload model generation module creates a workload model to test the critical performance of an application in the data processing network based on the plurality of transaction metrics and provide effective performance test strategies.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein:

FIG. 3 illustrates a schematic block diagram of the system used to create a workload model on the basis of transaction metrics, according to one embodiment of the present invention;

FIG. 4 illustrates an example of an activity log maintained in the environment;

DETAILED DESCRIPTION

Figure 1:
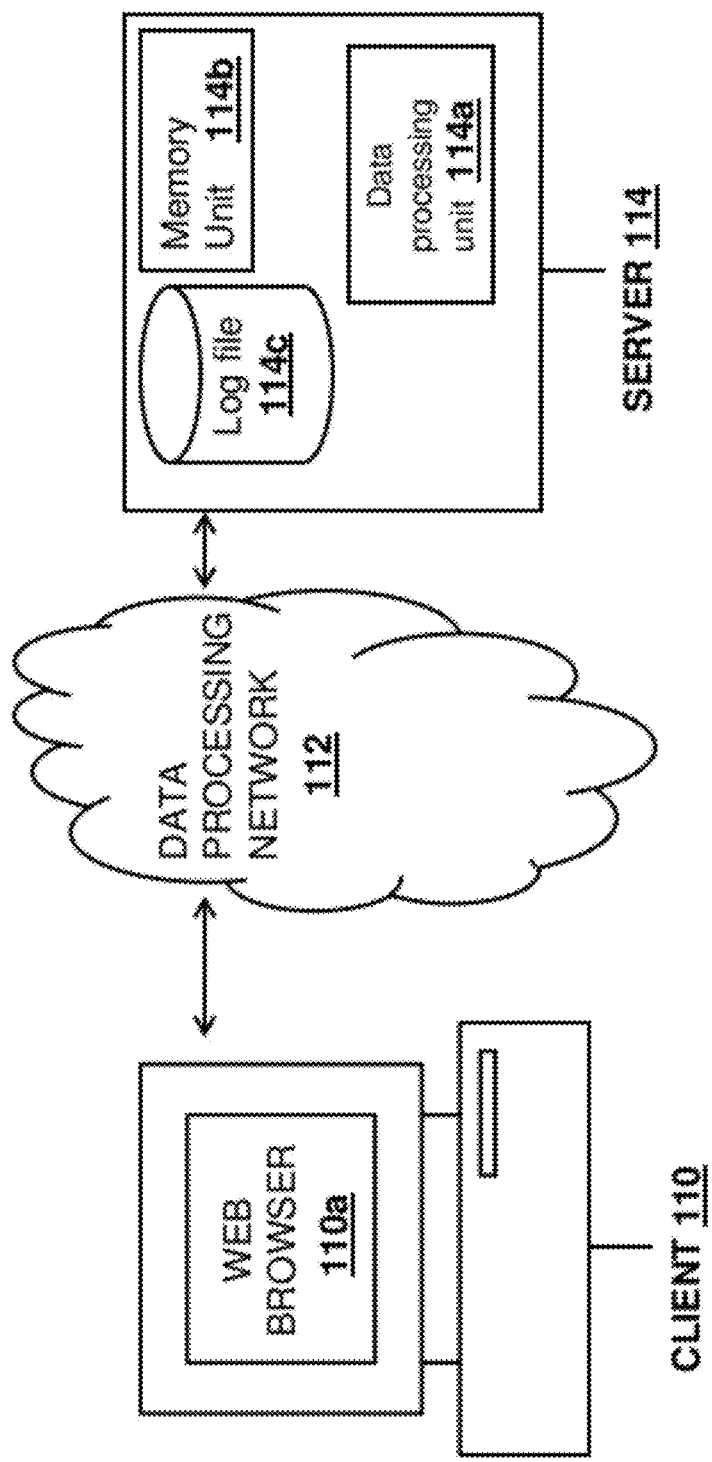
FIG. 1 illustrates a top level view of the environment in which the present invention is practised.

In a typical client-server model, a user, for example client 110 from FIG. 1, sends a request through a data processing network (DPN) 112. The request reaches the server 114 through the DPN 112 and is processed following which the server sends some result back to the client 110 through the DPN 112. FIG. 1 depicts a bird's eye view of such a model and the model which is being used in the present invention. The client 110, typically, makes use of a web browser 110a installed on his computer desktop or wireless mediums like laptop and mobile phone to access the DPN 112 which can be the Internet. The DPN 112 hosts various applications. The client 110 can access any of these applications by sending requests through the DPN 112. The server 114 provides necessary data/information for the applications hosted on the DPN 112. Any request that comes from the client is processed by the server 114's data processing unit 114a. Certain information can be stored in the memory unit 114b which may later be made use of to process the request. Log file 114c is used to maintain a record of all the requests and all parameters associated with the request. Finally, the server 114 sends back the response to the request in the form of processed data to the client 110 through the DPN 112.

The present invention, according to one embodiment of the present invention, is practised in the client-server model described in conjunction with FIG. 1. In particular, the present invention relates to web-server log analysis. Various applications such as banking transactions, online shopping cart etc. are hosted on the DPN 112 and there are numerous parameters such as throughput, average response time, number of server hits, number of active sessions, number of concurrent sessions etc. that are used to assess the performance of the application on the DPN 112. The trend with respect to web-server log analysis so far has been to focus on digging out the raw data from the logs and further analyzing the web logs at a page level, request level or the entire application level. The current technology refers throughput in terms of bytes per second. The responsiveness of the application is viewed at a page level that represents the server processing time for the requests. This raw data is further used as-is to estimate the basic performance test strategy metrics, more a guesstimate than an accurate figure.

As existing log analysis focuses on extracting the raw data as-is from the production logs and use it to base performance test strategies, it adds a lot of manual interpretation and effort in calculating the critical performance metrics. Each entry is seen in isolation and the techniques do not have intelligence built in to view a bunch of entries, termed as business transactions, for a particular user/session. The analysis hence cannot refer to throughput in terms of transactions per second and the responsiveness at the transactions level is difficult to compute. This ends up in critical information being lost during data interpretation, adding inaccuracies in the performance test strategies and thus, in performance test results.

The present invention removes the isolated view of each entry in the server logs and provides an approach to view business transactions. This reduces the manual interpretation of raw data, thus reducing the manual effort and time spent in web-server log analysis. The approach suggested in the present invention has the intelligence to collate log entries into a meaningful business transaction during log analysis.

Figure 2:
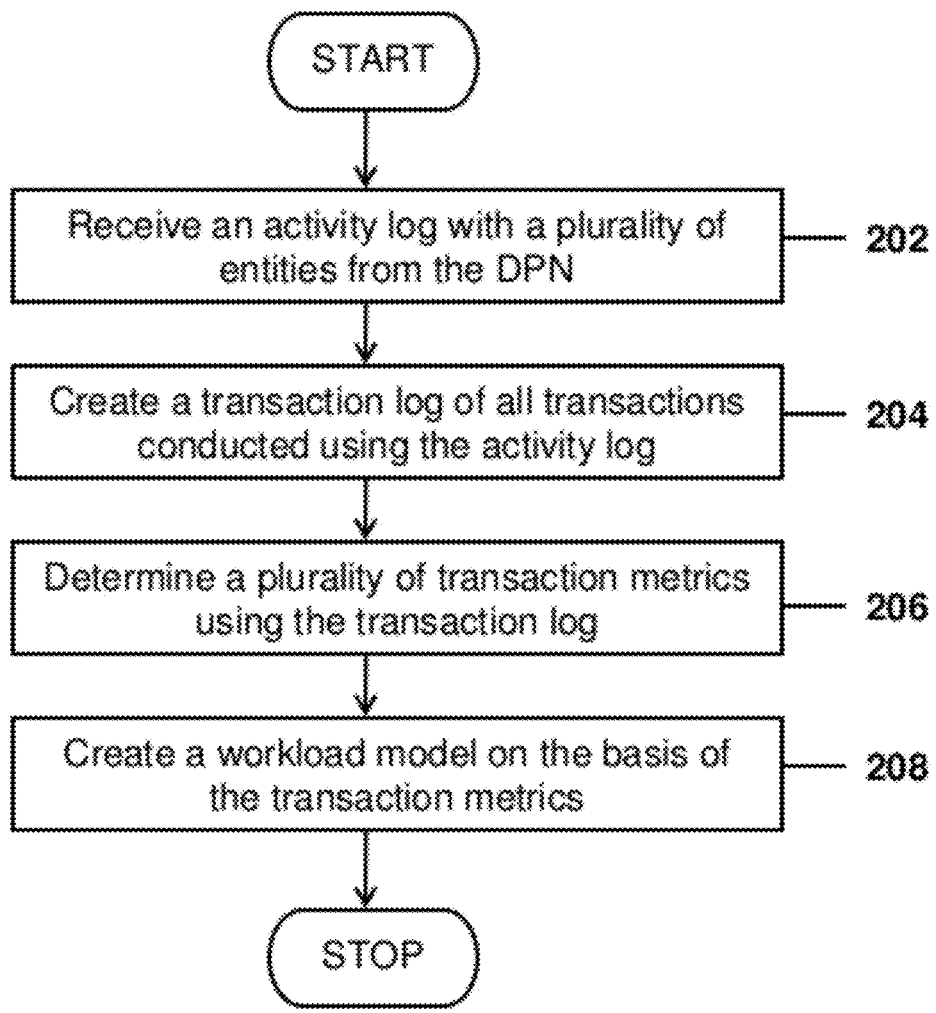
FIG. 2 illustrates a flow diagram of a method to create a workload model on the basis of transaction metrics, according to one embodiment of the present invention.

FIG. 2 illustrates an embodiment of a method to create a workload model to test critical performance of an application in the DPN 112 on the basis of transaction metrics. At step 202, the server 114 first receives an activity log from the DPN 112. The activity log includes a plurality of entities. There can be more than one server 114 and therefore more than one data processing unit 114a. An activity log is a log file containing information regarding all the requests that have been sent through the DPN 112 for a particular application. Typical information in the plurality of entities concerning the requests on the server 114 includes, but is not limited to, a date, a logged time, a time taken, a session identification number (SIN), a destination address etc. "A date" refers to the date when the request was placed by the client 110 on the DPN 112 and was thusly received by the server 114. "A logged time" refers to the time when the request was placed by the client 110 on the DPN 112 and was thusly received by the server 114. "A time taken" is the time taken by the server 114 to respond to the client 110's request through the DPN 114. "SIN" can also be called as a "cookie" which helps to represent a unique user session active on the server 114 at any particular time. For example, a user can log on to an application from two different instances of a web browser 102a from the same system. In such a case, the machine identification number is the same. However the session identification numbers are different. "A destination address" in the activity log is a Uniform Resource Locator (URL) of a webpage from the application in the data processing network.

At step 204, a transaction log is created out of the received activity log. The transaction log that is created at step 204 includes information pertaining to all the transactions identified with respect to a particular SIN with the aid of a parse algorithm which will be described in conjunction with FIG. 5. A transaction, with respect to a web application, is defined as a user defined logical sequence of destination addresses.

At step 206, the transactions identified are made use of in order to calculate the transaction metrics such as throughput, average response time, elapsed time, thinking time, number of server hits, number of active sessions, number of concurrent sessions etc. Some of the transaction metrics are defined below.

Elapsed time is the time taken to complete a transaction under analysis. To be specific, it is the difference, in terms of unit time, between the time when the request for the first URL in a transaction is received by the web server and the response for the last URL in a transaction is sent from a web server. It is represented by the formula:

$$\text{Elapsed time} = (LT_{last\ destination\ address} - LT_{first\ destination\ address}) + TT_{last\ destination\ address} \quad (1)$$

Transaction level think time is the time spent by an application user before he sends a request for each URL in a transaction. To be specific, URL level think time is the difference, in terms of unit time, between the time when the response for a previous URL is sent by the web server and the request for a current URL is received by the web server. A transaction level think time for a particular transaction can then be calculated as summation of think times for all URLs that are a part of that transaction. It is represented by the formula:

$$\text{Transaction think time for destination address}_n = (\Sigma(LT_n - LT_{n-1}) - TT_{n-1})/(\text{number of destination addresses in the transaction}) \quad (2)$$

Response time of the server/data processing unit in the DPN 112 is the total time taken by the server to service the requests for individual URLs in a transaction. To be specific, it is the summation of the entries under "time taken" field in the web server logs for each URL in a transaction. It is represented by the formula:

$$\text{Response time of data processing unit} = \Sigma(TT \text{ for all the destination addresses in a transaction}) \quad (3)$$

Transaction throughput is defined as the number of transactions executed in a certain time period by the DPN 112. It is represented by the formula:

$$\text{Transaction throughput for a session identification number '}X\text{'} = \text{Number of transaction for '}X\text{'}/(\Sigma(\text{Elapsed time of each transaction})) \quad (4)$$

Lastly, total transaction throughput is represented by the formula:

Total transaction throughput=(Σ(Transaction throughput for all session identification numbers)/(Total number of session identification numbers) (5)

For all the formulae used above,
'n' is the total number of destination addresses traversed in one transaction corresponding to a particular session identification number,
'LT' is the logged time, and
'TT' is the time taken.

At step 208, a workload model is created on the basis of the plurality of transaction metrics in order to test the critical performance of an application in the data processing network. The present invention helps a DPN administrator in finding out transaction level throughput and responsiveness which further improves the accuracy of the performance test strategy. The performance metrics defined at a transaction level have more business relevance and can be directly used as inputs for creating effective performance test strategies.

FIG. 3 illustrates another embodiment of the invention where a system capable of creating a workload model in order to test critical performance of an application in a data processing network is described. The system includes a receiving module 302 that receives an activity log with a plurality of entities from the data processing network. Further the system includes a processor 304 used to create a transaction log, using the activity log, of all transactions conducted and further determine a plurality of transaction metrics using the transaction log. The system also includes a workload model generating module 306 to create a workload model to test the critical performance of an application in the data processing network 112 based on the plurality of transaction metrics and provide effective performance test strategies.

The receiving module 302, receives an activity log from the DPN 112. The activity log includes a plurality of entities. There can be more than one server 114 and therefore more than one data processing unit 114a. An activity log is a log file containing information regarding all the requests that have been sent through the DPN 112 for a particular application. Typical information in the plurality of entities concerning the requests on the server 114 includes, but is not limited to, a date, a logged time, a time taken, a session identification number (SIN), a destination address etc.

The processor 304 creates a transaction log from the activity log that was received by the receiving module 302. The transaction log created by the processor 304 includes information pertaining to all the transactions identified with respect to a particular SIN with the aid of a parse algorithm which will be described in conjunction with FIG. 5. A transaction, with respect to a web application, is defined as a user defined logical sequence of destination addresses. The processor 304 further determines a plurality of transaction metrics such as throughput, average response time, elapsed time, thinking time, number of server hits, number of active sessions, number of concurrent sessions etc. Elapsed time defined as the time taken to complete a transaction under analysis is calculated using FORMULA 1, as mentioned above. Transaction level think time defined as the time spent by an application user before he sends a request for each URL in a transaction is calculated using FORMULA 2, as mentioned above. Response time of the server/data processing unit in the DPN 112 defined as the total time taken by the server to service the requests for individual URLs in a transaction is calculated using FORMULA 3, as mentioned above. Transaction throughput defined as the number of transactions executed in a certain time period by the DPN 112 is calculated using FORMULA 4, as mentioned above. Total transaction throughput is calculated using FORMULA 5, as mentioned above.

The workload model generating module 306 creates the workload model based on the plurality of transaction metrics. The workload model is further used to test the critical performance of the application in the DPN. The performance metrics defined at a transaction level has more business relevance and can be directly used as inputs for creating effective performance test strategies.

According to one embodiment of the invention, a transaction, with respect to a business application, is defined as a user defined logical sequence of destination addresses. The destination address in the activity log is a Uniform Resource Locator (URL) of a webpage from the application in the data processing network.

FIG. 4 captures a typical activity log file hosted in the server 114. The activity log is a log file containing information regarding all the requests that have been sent through the DPN 112 for a particular application. Typical information in the plurality of entities concerning the requests on the server 114 includes, but is not limited to, a date, a logged time, a time taken, a session identification number (SIN), a destination address etc. According to FIG. 4, the plurality of entities such as "date" is represented as "date", "logged time" as "time", "time taken" as "time taken", "session identification number" as "cookie" and "destination address" as "request".

Figure 5A:
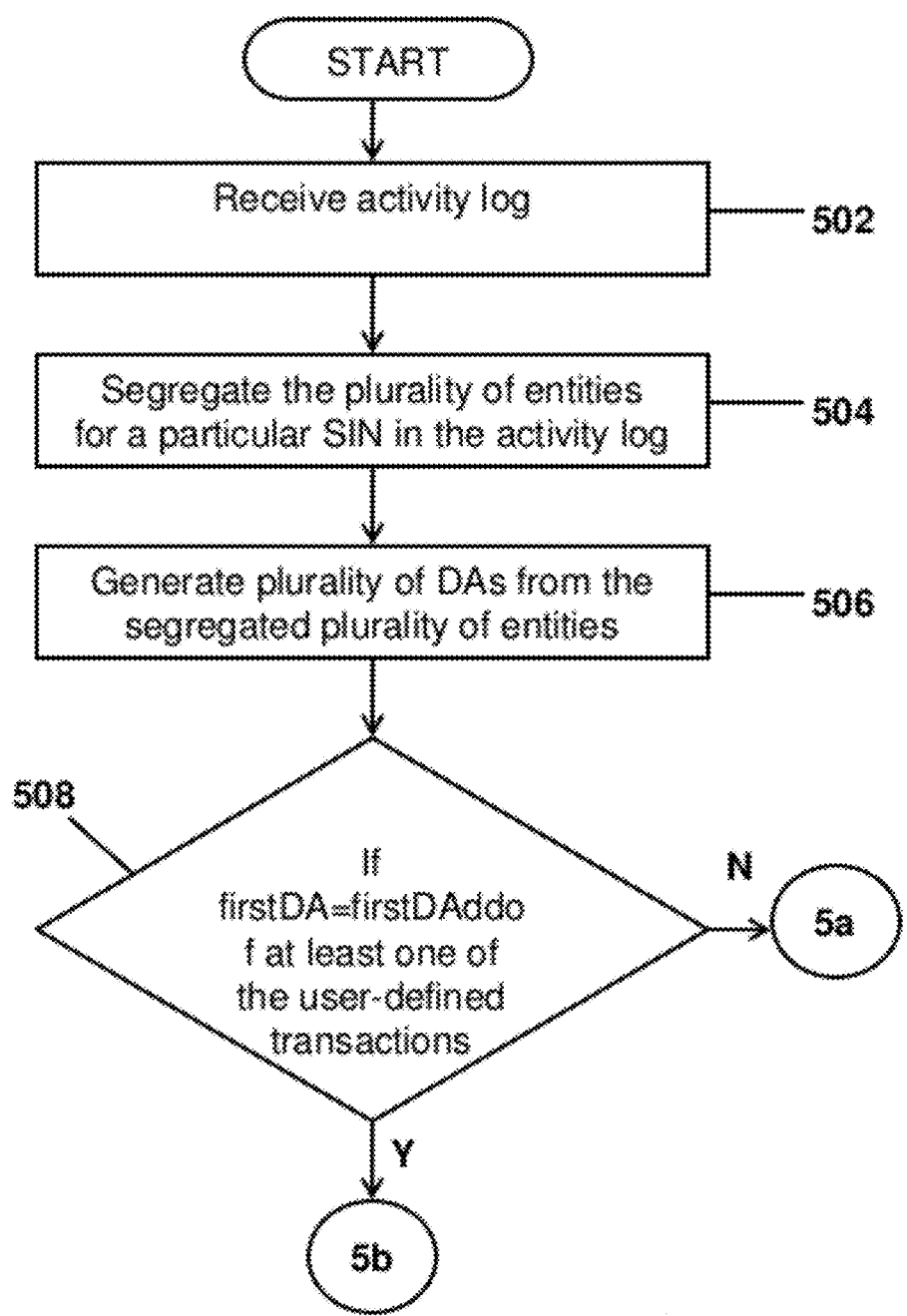
FIGS. 5a and 5b illustrate a flow diagram of the steps involved in the parse algorithm used to identify a transaction, according to one embodiment of the present invention.
Figure 5B:
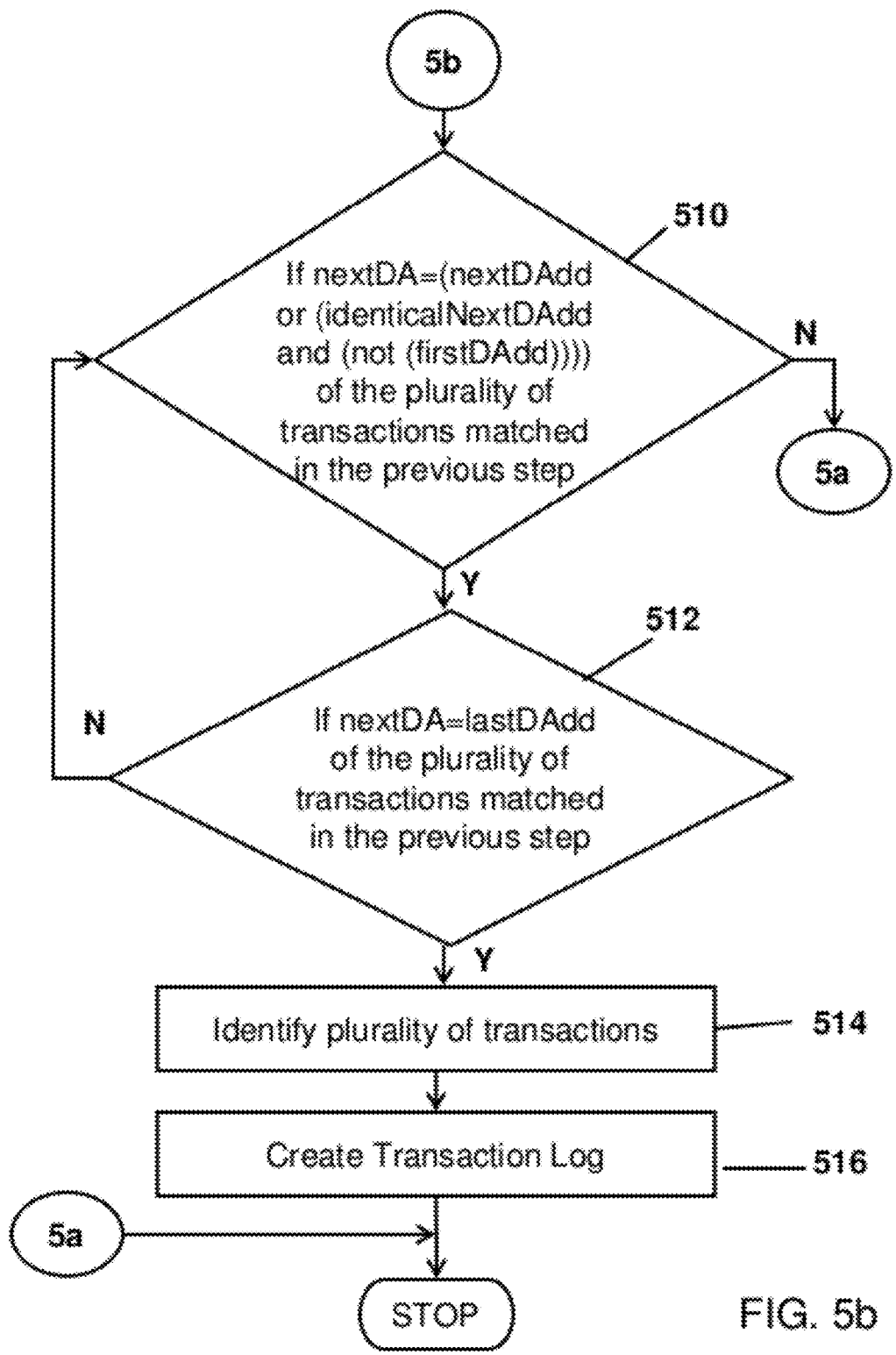

FIGS. 5a and 5b illustrate the parsing algorithm used to identify transactions and finally create a transaction log from the activity log that is received at the server 114. At step 502, an activity log comprising a plurality of entities is received at the server 114. The activity log comprises a plurality of entities such as a date, a logged time, a time taken, a session identification number (SIN), a destination address etc with respect to a particular application operating in the DPN 112.

At step 504, the plurality of entities in the activity log is segregated with respect to a particular SIN of the application. A particular user can log on to an application from two different instances of a web browser 102a from the same system. In such a case, the machine identification number is the same. However the session identification numbers are different. At step 506, from the segregated plurality of entities made on the basis of SIN, a plurality of destination addresses (DAs) is segregated. According to one embodiment of the invention, a transaction, with respect to a business application, is defined as a user defined logical sequence of destination addresses (DAdds).

At step 508, it is checked if a first destination address (firstDA) from the segregated entities corresponding to the particular session identification number matches with a first destination address (firstDAdd) of at least one of the transactions defined by the user. If such a match exists in the plurality of segregated entities, the parsing is continued further. If not, the parsing is terminated as no such transaction is defined by the user.

In other words, if (firstDA=firstDAdd of at least one of the user-defined transactions) is true, then the parsing algorithm goes to step 510 where it checks if the next destination address (nextDA) from the segregated entities corresponding to the particular session identification number matches with either the next destination address (nextDAdd) of at least one of the transactions defined by the user and identified as matching in the previous step or an identical destination address (IdenticalNextDAdd) but not the first destination address (firstDAdd). If yes, the parsing is continued further. If no, the parsing is terminated as no such transaction is defined by the user.

In other words, if (nextDA=(nextDAdd OR (identicalNextDAdd AND (NOT (firstDAdd)))) of the plurality of transactions matched in the previous step) is true, the parsing algorithm goes to step 512 where it checks if the next destination address (nextDA) from the segregated entities corresponding to the particular session identification number matches with the next destination address (lastDAdd) of at least one of the transactions defined by the user as identified in the previous step. This check is done till all the destination addresses (DAs) from the segregated entities corresponding to the particular session identification number match with all the destination addresses (DAdds) of at most one transaction defined by the user, ensuring the first and the last destination addresses in the plurality of entities corresponding to any session identification number are not repeated at all while the destination addresses in between the first and the last destination addresses are repeated as many times although in the same sequence.

For example, assume a transaction T1 is defined by the user as a logical sequence of destination addresses as T1: ABCD, wherein A, B, C and D are the destination addresses. Various definitions of a valid transaction T1 are ABBCD, ABBCCCD and ABCD and so on and so forth. Various definitions of an invalid transaction T1 are ABD, ABC, AABCCDD, BCD and BBBBCCCD and so on and so forth.

In other words, if (nextDA=lastDAdd of the plurality of transactions matched in the previous step) is true, the parsing algorithm goes to step 514 where one or more transaction has been identified. In step 516, a transaction log is created which contains all the transactions identified with respect to a particular SIN. Further, parameters for transactions identified for each SIN are summed up to determine values of transaction metrics such as transaction think time, response time, total transaction throughput etc.

Figure 6:
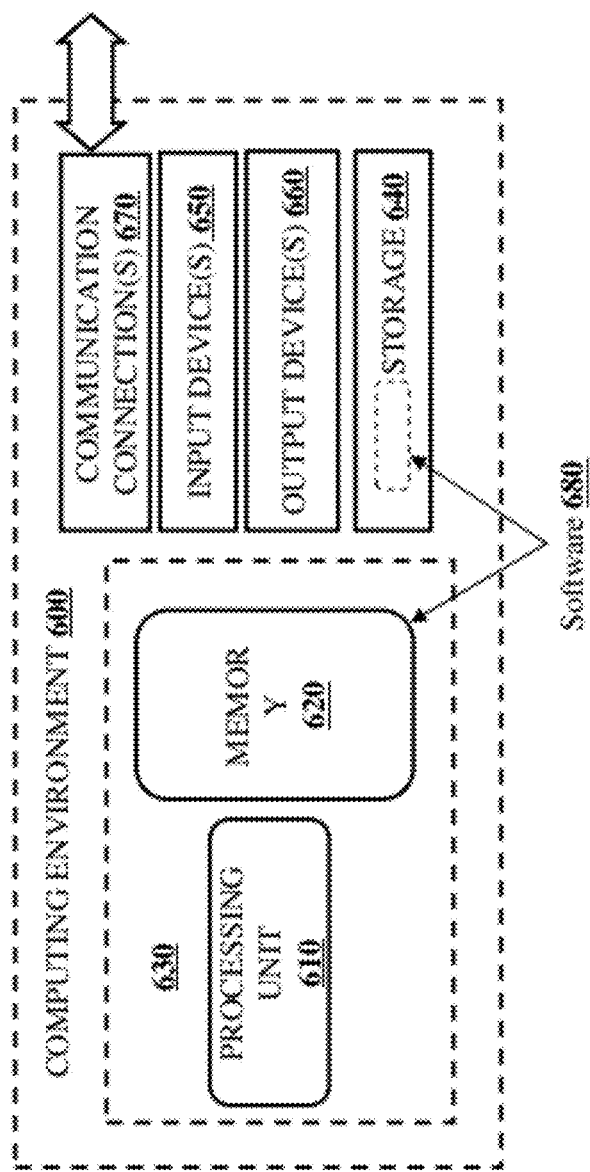
FIG. 6 is a system illustrating a generalized computer network arrangement, in one embodiment of the present technique.

One or more of the above-described techniques may be implemented in or involve one or more computer systems. FIG. 6 illustrates a generalized example of a computing environment 600. The computing environment 600 is not intended to suggest any limitation as to scope of use or functionality of described embodiments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. In some embodiments, the memory 620 stores software 680 implementing described techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which may be used to store information and which may be accessed within the computing environment 600. In some embodiments, the storage 640 stores instructions for the software 680.

The input device(s) 650 may be a touch input device such as a keyboard, mouse, pen, trackball, touch screen, or game controller, a voice input device, a scanning device, a digital camera, or another device that provides input to the computing environment 600. The output device(s) 660 may be a display, printer, speaker, or another device that provides output from the computing environment 600.

The communication connection(s) 670 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 600, computer-readable media include memory 620, storage 640, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest cope consistent with the principles and features described herein.

Many modifications of the present invention will be apparent to those skilled in the arts to which the present invention applies. Further, it may be desirable to use some of the features of the present invention without the corresponding use of other features.

Accordingly, the foregoing description of the present invention should be considered as merely illustrative of the principles of the present invention and not in limitation thereof.

What is claimed is:

1. A method for creating workload model to test performance of an application in a data processing network, wherein the data processing network comprises a plurality of data processing units, the method comprising:

receiving, at one of the plurality of data processing units, an activity log with a plurality of entities from the data processing network, wherein each entity of the activity log comprises a session identification number;

creating a transaction log of all transactions conducted using the activity log, wherein a user defines at least one transaction with respect to a particular session identification number, and wherein the at least one transaction is a business transaction flow, the business transaction flow comprising a user defined logical sequence of destination addresses;

determining a plurality of transaction metrics using the transaction log, wherein the plurality of transaction metrics comprises an average transaction response time, a transaction throughput for a session identification number, and a total transaction throughput for all session identification numbers, wherein the determination of the transaction throughput for a session identification number and the total transaction throughput for all the session identification numbers comprises:

a. transaction throughput for a session identification number 'X'=number of transaction for 'X'/(Σ (elapsed time of each transaction))
   b. total transaction throughput for all the session identification numbers=(Σ(transaction throughput for all session identification numbers)/(total number of session identification numbers), wherein the total transaction throughput is the number of transactions executed in a certain time period; and creating a workload model to test the performance of the application in the data processing network based on the plurality of transaction metrics and provide performance test strategies.

2. The method as recited in claim 1, wherein the activity log is maintained at a plurality of data processing units in the data processing network.

3. The method as recited in claim 1, wherein each entity of the activity log further comprises a date, a logged time, a time taken and a destination address.

4. The method as recited in claim 1, wherein the transaction log is created from the activity log using a parsing algorithm, the parsing algorithm comprising:

segregating the plurality of entities for the particular session identification number from the activity log;

determining if a first destination address from the segregated entities corresponding to the particular session identification number matches with a first destination address of at least one of the transactions defined by the user;

further determining, only after the first destination addresses are found matching, if a second destination address from the segregated entities corresponding to the particular session identification number matches with a second destination address of at least one of the transactions as identified in the previous step; and continuing in the same manner till all the destination addresses from the segregated entities corresponding to the particular session identification number match with all the destination addresses of at most one transaction defined by the user, ensuring the first and the last destination addresses in the plurality of entities corresponding to any session identification number are not repeated at all while the destination addresses in between the first and the last destination addresses are repeated as many times although in the same sequence.

5. The method as recited in claim 1, wherein said determining the plurality of transaction metrics comprises determining an elapsed time, defined as the difference, in terms of unit time, between the time when the request for the first destination address in a transaction is received by the data processing unit and the response for the last destination address in a transaction is sent from a data processing unit.

6. The method as recited in claim 1, wherein said determining the plurality of transaction metrics comprises determining transaction level think time, defined as the summation of all destination address level think times, a destination address level think time defined as the difference, in terms of unit time, between the time when the response for a previous destination address is sent by the data processing unit and the request for the current destination address is received by the data processing unit.

7. The method as recited in claim 1, wherein said determining the plurality of transaction metrics comprises determining response time of data processing unit, defined as the summation of the entries under "time taken" field in the activity log for each destination address in a transaction.

8. The method as recited in claim 3, wherein the destination address in the activity log is a Uniform Resource Locator (URL) of a webpage from the application in the data processing network.

9. A system capable of creating a workload model in order to test performance of an application in a data processing network, wherein the data processing network comprises a plurality of data processing units, the system comprising:

a receiving module to receive an activity log with a plurality of entities from the data processing network, wherein each entity of the activity log comprises a session identification number;

a processor configured to:

create a transaction log of all transactions conducted using the activity log, wherein a user defines at least one transaction with respect to a particular session identification number, and wherein the at least one transaction is a business transaction flow, the business transaction flow comprising a user defined logical sequence of destination addresses; and determine a plurality of transaction metrics using the transaction log, wherein the plurality of transaction metrics comprises an average transaction response time, a transaction throughput for a session identification number, and a total transaction throughput for all session identification numbers, wherein the determination of the transaction throughput for a session identification number and the total transaction throughput for all the session identification numbers comprises:

a. transaction throughput for a session identification number 'X'=number of transaction for 'X'/(Σ (elapsed time of each transaction))
      b. total transaction throughput for all the session identification numbers=(Σ(transaction throughput for all session identification numbers)/(total number of session identification numbers), wherein the total transaction throughput is the number of transactions executed in a certain time period; and a workload model generating module to create a workload model to test the performance of the application in the data processing network based on the plurality of transaction metrics and provide performance test strategies.

10. The system as recited in claim 9, wherein receiving module automatically retrieves the activity log from the memory of the plurality of data processing units in the data processing network.

11. The system as recited in claim 9, wherein each entity of the activity log further comprises a date, a logged time, a time taken and a destination address.

12. The system as recited in claim 9, wherein the processor creates the transaction log from the activity log using a parsing algorithm, the processor is further configured to:
segregate the plurality of entities for the particular session identification number from the activity log;
determine if a first destination address from the segregated entities corresponding to the particular session identification number matches with a first destination address of at least one of the transactions defined by the user;
further determine, only after the first destination addresses are found matching, if a second destination address from the segregated entities corresponding to the particular session identification number matches with a second destination address of at least one of the transactions defined by the user as identified in the previous step; and
continue in the same manner till all the destination addresses from the segregated entities corresponding to the particular session identification number match with all the destination addresses of at most one transaction defined by the user, ensuring the first and the last destination addresses in the plurality of entities corresponding to any session identification number are not repeated at all while the destination addresses in between the first and the last destination addresses are repeated as many times although in the same sequence.

13. The system as recited in claim 9, wherein the processor determines the plurality of transaction metrics, the processor is configured to determine an elapsed time, defined as the difference, in terms of unit time, between the time when the request for the first destination address in a transaction is received by the data processing unit and the response for the last destination address in a transaction is sent from a data processing unit.

14. The system as recited in claim 9, wherein the processor determines the plurality of transaction metrics, the processor is configured to determine transaction level think time, defined as the summation of all destination address level think times, a destination address level think time defined as the difference, in terms of unit time, between the time when the response for a previous destination address is sent by the data processing unit and the request for the current destination address is received by the data processing unit.

15. The system as recited in claim 9, wherein the processor determines the plurality of transaction metrics, the processor is configured to determine response time of data processing unit, defined as the summation of the entries under "time taken" field in the activity log for each destination address in a transaction.

16. The system as recited in claim 11, wherein the destination address in the activity log is a Uniform Resource Locator (URL) of a webpage from the application in the data processing network.

17. A computer storage device tangibly embodying a plurality of instructions adapted for creating a workload model in order to test performance of an application in a data processing network, wherein the data processing network comprises a plurality of data processing units, the computer storage device comprising:
a computer readable medium storing:
program code adapted for receiving, at a computing device, an activity log with a plurality of entities from the data processing network, wherein each entity of the activity log comprises a date, a logged time, a time taken, a session identification number, and a destination address;
program code adapted for creating a transaction log of all transactions conducted using the activity log, wherein a user defines at least one transaction with respect to a particular session identification number, and wherein the at least one transaction is a business transaction flow, the business transaction flow comprising a user defined logical sequence of destination addresses;
program code adapted for determining a plurality of transaction metrics using the transaction log, wherein the plurality of transaction metrics comprises an average transaction response time, a transaction throughput for a session identification number and a total transaction throughput for all session identification numbers wherein the determination of the transaction throughput for a session identification number and the total transaction throughput for all the session identification numbers comprises:
a. transaction throughput for a session identification number 'X'=number of transaction for 'X'/($\Sigma$ (elapsed time of each transaction))
b. total transaction throughput for all the session identification numbers=($\Sigma$(transaction throughput for all session identification numbers)/(total number of session identification numbers), wherein the total transaction throughput is the number of transactions executed in a certain time period; and
program code adapted for creating a workload model to test the performance of the application in the data processing network based on the plurality of transaction metrics and provide performance test strategies.

* * * * *